United States Patent
Long et al.

(10) Patent No.: US 12,475,136 B1
(45) Date of Patent: Nov. 18, 2025

(54) TRANSFORMING DATA USING DATABASE, OBJECT ORIENTED PROGRAMMING, AND STORED PROGRAM CONCEPTS

(71) Applicant: Trulioo Information Services Inc., Vancouver (CA)

(72) Inventors: Jon Mark Long, Santee, CA (US); Aida Sadykova, London (GB); Robert James Long, Carmel, CA (US); Sandeep Reddy Vakiti, Vancouver (CA)

(73) Assignee: Trulioo Information Services Inc., Vancouver (CA)

( * ) Notice: Subject to any disclaimer, the term of this patent is extended or adjusted under 35 U.S.C. 154(b) by 0 days.

(21) Appl. No.: 18/883,993

(22) Filed: Sep. 12, 2024

(51) Int. Cl.
*G06F 16/00* (2019.01)
*G06F 16/21* (2019.01)
*G06F 16/25* (2019.01)

(52) U.S. Cl.
CPC .......... *G06F 16/254* (2019.01); *G06F 16/213* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 8,401,990 | B2* | 3/2013 | Silsby | G06F 16/283 707/601 |
| 9,020,981 | B2* | 4/2015 | Morrison | G06F 16/211 707/779 |
| 11,113,294 | B1* | 9/2021 | Bourbie | G06F 16/24568 |
| 11,275,733 | B1* | 3/2022 | Batsakis | G06F 16/137 |
| 11,500,826 | B2* | 11/2022 | Maurya | G06F 16/211 |
| 11,860,940 | B1* | 1/2024 | Batsakis | G06F 16/2471 |
| 11,874,691 | B1* | 1/2024 | Batsakis | G06F 16/2282 |
| 2007/0106683 | A1* | 5/2007 | Grabelsky | G06F 16/27 707/999.102 |
| 2010/0023546 | A1* | 1/2010 | Silsby | G06F 16/283 707/E17.005 |
| 2014/0282586 | A1* | 9/2014 | Shear | G06F 16/245 718/104 |
| 2017/0006135 | A1* | 1/2017 | Siebel | G06F 8/24 |
| 2022/0076164 | A1* | 3/2022 | Conort | G06N 20/00 |
| 2022/0309037 | A1* | 9/2022 | Gutierrez | G06F 16/16 |
| 2022/0382755 | A1* | 12/2022 | Batsakis | G06F 16/137 |
| 2024/0160632 | A1* | 5/2024 | Ghosal | G06F 16/211 |
| 2025/0165440 | A1* | 5/2025 | Medvedev | G06F 16/9024 |

* cited by examiner

*Primary Examiner* — Farhan M Syed
(74) *Attorney, Agent, or Firm* — Faegre Drinker Biddle & Reath (57) ABSTRACT

Systems and methods for transforming data using database are provided. In examples, a method includes instantiating a base schema having template metadata and deriving a plurality of stage schemas from the base schema. Each stage schema is associated with a respective data source, includes a respective stage table populated from the respective data source, and includes metadata inherited from the template metadata when the respective stage schema was derived from the base schema. The method further includes receiving a plurality of sets of raw data being associated with respective data sources of the plurality of data sources. The method further includes extracting one or more respective data items from each stage table using a respective mapping from the corresponding stage schema to a master schema.

20 Claims, 6 Drawing Sheets

Raw Data Example

CompanyName, CompanyNumber, RegAddress.Careof, RegAddress. POBox, RegAddress.AddressLine1, RegAddress.AddressLine2, RegAddress. PostTown, RegAddress. County, RegAddress. Country, RegAddress. PostCode, CompanyCategory, CompanyStatus, Countryoforigin, DissolutionDate, IncorporationDate, Accounts. AccountRefDay, Accounts. AccountRefMonth, Accounts. NextDueDate, Accounts. Las tMadeUpDate, Accounts. AccountCategory, Returns. NextDueDate, Returns. LastMadeUpDate, Mortgages. NumMortCharges, Mortgages. NumMortOutstandi ng, Mortgages. NumMortPartSatisfied, Mortgages. NumMortSatisfied, SICCode. SicText_1, SICCode. SicText_2, SICCode. SicText_3, SICCode.SicText_ 4,LimitedPartnerships. NumGenPartners, LimitedPartnerships. NumLimPartners, URI, PreviousName_1.CONDATE, PreviousName_1.CompanyName, PreviousName_2. CONDATE, PreviousName_2. CompanyName, Previous Name_3.CONDATE, PreviousName_3. CompanyName, PreviousName_4.CONDATE, PreviousName_4. CompanyName, PreviousName_5.CONDATE, PreviousName_5. CompanyName, PreviousName_6. CONDATE, PreviousName__ 6. CompanyName, PreviousName_7.CONDATE, PreviousName_7. CompanyName, PreviousName_8. CONDATE, PreviousName_8.CompanyName, PreviousName__ 9.CONDATE, PreviousName_9. CompanyName, Previous Name_10.CONDATE, PreviousName_10. CompanyName, ConfStmtNextDueDate, ConfStmtLastMadeUpDate "FAKE COMPANY LTD", "12345678","", "","1 GUMDROP ROAD", ,"FAIRYLAND", ",""","ENGLAND", "GU1 4RY", "PRI/LTD (Private, limited by guarantee, no share capital)", "Active", "United Kingdom", "", "1/1/2022","5","5","1/1/2024", "", "NO ACCOUNTS FILED", "4/5/2023", ,"0","0","0","0","33140 - Repair of electrical equipment", "47421 - Retail sale of mobile telephones" "0", "o","http://business.data.gov.uk/id/company/12345678", "", "" ",", "1/1/2023""" "LTD", "45678910" Company", "Active", "United Kingdom" "" "" "" "0", "http://business.data.gov.uk/id/company/45678910", "", "", "" 1/1/2023","1/1/2022" ,"THE OTHER FAKE COMPANY", "PARIS", "DALLAS","", "UNITED KINGDOM", "SK6 3DY", "Private Limited Company", "Active", "United Kingdom", "", "1/1/2018","20","5","1/1/2023", "1/1/ 2021", "TOTAL EXEMPTION FULL", "1/1/2019", "","0","0","0","0",

TRANSFORMING DATA USING DATABASE, OBJECT ORIENTED PROGRAMMING, AND STORED PROGRAM CONCEPTS

BACKGROUND

Object-Oriented Programming (OOP) is a programming paradigm centered around the concept of "objects" and may be used in a variety of contexts. A data warehouse is a central repository of information that stores and organizes data from multiple data sources.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for transforming data using database, OOP, and stored program concepts.

Some examples provided herein include instantiating a base schema having template metadata. The base schema can be analogous to an OOP abstract class with inheritable properties. Examples herein can include deriving a plurality of stage schemas from the base schema. Each stage schema can be associated with a respective data source (e.g., from a plurality of different data sources that each have different formats and/or languages for raw data). Each stage schema can include a respective data structure populated with raw data from the respective data source for the stage schema and can include metadata inherited from the template metadata of the base schema when the respective stage schema was derived from the base schema. The metadata of the stage schemas can include instructions for dynamically updating a master schema based on the received raw data populated into the data structures. One or more data items from the data structures can be extracted using a mapping between the stage schemas with the one or more data items and the master schema, and the one or more data items can then be stored in the master schema. Via a front-end computing process, a query can be received to populate a user interface with at least one data item from the one or more data items stored in the master schema. Examples provided herein allow for efficiently aggregating data from a plurality of different sources with different data formats, and storing them in a manner efficient for subsequent retrieval in a user-friendly format.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, Object-Oriented Programming (OOP) is a programming paradigm centered around the concept of "objects" and may be used in a variety of contexts. In some examples of the present application, OOP concepts can be used with databases. OOP includes a principle called encapsulation. Encapsulation involves bundling data (e.g., attributes) and methods (e.g., functions) that operate on the data into a single unit called a class. In some examples, OOP inheritance allows a new class (e.g., a subclass or derived class) to inherit attributes and methods from an existing class (e.g., a superclass or base class). Accordingly, OOP enables easy code reuse and establishes a hierarchical relationship between classes.

Conventional techniques for hosting data aggregated from a plurality of different sources may face several challenges. For examples, some challenges include receiving data in a plurality of different formats or layouts. For instance, the different formats can have different names, labels, languages, amounts of data, types of data attributes, spellings, acronyms, or other differences that may be recognized by those of ordinary skill in the art. Moreover, the difficulties of transforming all of the data into a uniform format can be exasperated when receiving enormous amounts of data. Not to mention, some conventional techniques require manually programming unique data transformation algorithms for each different data format received.

Mechanisms provided herein for transforming data offer several benefits over conventional techniques. Some examples provided herein include treating an instance of a database endpoint as if it is a base class in an OOP language. In some examples, configurations, error logging, performance logging, operations logging, and components of a state machine can all be attributes or parameters added to the base class (e.g., a stage schema). In some examples, computer instructions, such as SQL statements, can be stored as metadata in the class such that the statements are ordered and tagged as if they are instructions in a stored program. In some examples, many programs (e.g., many sets of computer instructions) can be stored at the same time and allow for different programs to reuse and/or share, statements from a store (e.g., a metadata store of computer instructions accessible via different base classes associated with different database endpoints). In some examples, parameters values of a class or schema associated with a database endpoint can be dynamically updated. For example, the parameter values can be dynamically updated at a run time, such as when raw data from one or more databases is received.

In examples, the mechanisms provided herein allow for efficiently aggregating data from a plurality of different sources with different data formats, and storing them in a manner efficient for subsequent access. Accordingly, in examples, the mechanisms provided herein also allow for efficiently retrieving stored data that was aggregated from a plurality of different sources with different data forms, and presenting the retrieved data in a user-friendly format, via a user interface.

In some examples, the name of a schema can be one of the dynamically updated parameters, such as by dynamically updating the schema name at runtime. In some examples, methods can be added to a base schema as stored procedures installed in the base schema, that operate with data added to the base schema. In examples, stage schemas can be derived from the base schema and inherit the stored procedures from the base schema, to easily create stage schemas associated with different data sources. Accordingly, mechanisms provided herein provide advantageous solutions for transforming data with stored programs inside of a database instance itself, by leveraging principles from OOP.

In some examples, a schema in a database engine can be analogous to a class in an OOP paradigm. For example, a schema can define a structure of data (analogous to class properties) by organizing data into data structures, such as into tables, rows, and/or columns. Each column, like a class attribute, can represent a specific aspect of a data entity. Schemas can also encapsulate behavior by defining stored procedures and/or functions, which can be analogous to class methods in OOP. These methods can allow the manipulation and processing of data within the schema.

In some examples, a base schema can be created, which defines a common set of tables, columns, and/or methods (e.g., stored functions). Other schemas can then inherit from this base schema, mimicking the OOP concept of inheritance, allowing the other schemas to reuse the base schema's structure while also being able to add their own specific structures, features, and/or behaviors. In this way, new schemas (e.g., derived stage schemas) can extend the functionality of a base schema by inheriting structures, features, behaviors, and/or other data from the base schema.

Each schema can also have its own interface defined, specifying the operations (stored functions) that it implements. Different schemas can implement their interfaces in various ways while still sharing common structures or methods inherited from a base schema. The interface can ensure that even though each schema may be unique, they all can adhere to a common framework of operations, similar to the OOP concept of polymorphism. Furthermore, each derived schema may deal with unique raw data, originating from different sources. This raw data can be processed and transformed by custom or bespoke logic unique to each derived schema into a master schema (e.g., canonical data model). In some examples, the master schema is a standardized structure that organizes the data relationally and ensures consistency. The custom transformations enabled via techniques provided herein ensures that while the raw data may vary significantly between sources, the master data retains uniformity, enhancing its usability within the framework.

By leveraging different mappings during the transformation from raw data to a master schema, mechanisms provided herein enhance both the efficiency of data storage and the ease with which data can be accessed and/or provided to users. Raw data, often unnormalized, can contain redundant information and repeating groups, which makes it inefficient to store and difficult to query.

In some examples, as data is normalized, such as where repeating fields are eliminated, to where partial and transitive dependencies are removed, the schemas can become increasingly more structured and optimized for efficient querying. In some examples, a normalization process minimizes redundancy and ensures that relationships between data entities are clear and well-defined, to enforce data integrity, avoid anomalies, and optimize queries. This structured approach reduces unnecessary data duplication, leading to more efficient storage and faster query performance, while also making data models easier to reason about because each table and column has a clear, singular purpose within the relational framework.

Figure 1:
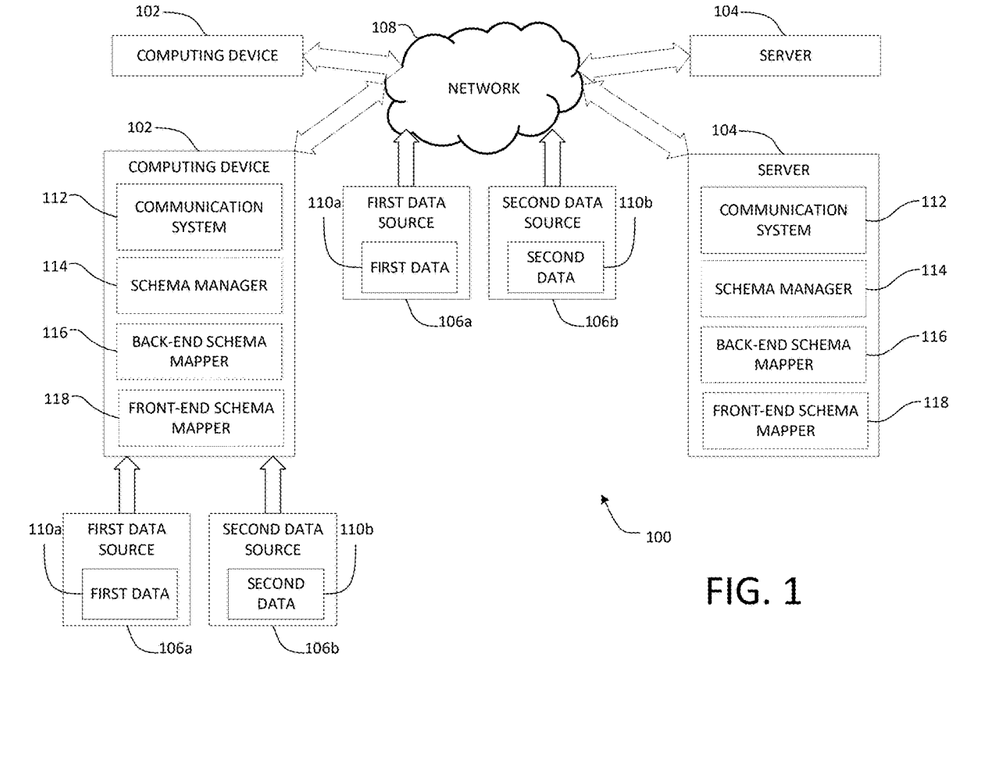
FIG. 1 illustrates an example system according to some aspects described herein.

FIG. 1 shows an example of a system 100, in accordance with some aspects of the disclosed subject matter. The system 100 may be a system for transforming data, such as using database, OOP, and stored program concepts. The system 100 includes one or more computing devices 102, one or more servers 104, a plurality of data sources 106 (such as a first data source 106*a* and a second data source 106*b*), and a communication network or network 108.

The computing device 102 can receive data 110 (such as first data 110*a* and/or second data 110*b*) from the plurality of data sources 106, which may be, for example, a service that aggregates or otherwise receives data, a computer-executed program that generates data, and/or memory with data stored therein corresponding to first/second data 110*a*/110*b*. In some examples, the first data 110*a* and/or second data 110*b* include business registration data. For example, the business registration data can include a business address, a business name, a business status, a jurisdiction of incorporation of the business, a date of incorporation, and/or a business entity type. The business registration data may include additional and/or alternative types of business registration data that may be recognized by those of ordinary skill in the art.

In some examples, the first data 110*a* and/or second data 110*b* include other types of data, such as personal identifiable information, medical data, employment data, travel expense data, logistic data (e.g., for consumer goods, commercial products, shipments, etc.), utility company data, mortgage company data, insurance company data, real estate company data, phone company data, finance company data, bill payment data, and/or other types of data recognized by those of ordinary skill in the art.

Additionally, or alternatively, the network 108 can receive data 110 (such as first data 110*a* and/or second data 110*b*) from the plurality of data sources 106, which may be, for example, a service that aggregates or otherwise receives data, a computer-executed program that generates data, and/or memory with data stored therein corresponding to first/second data 110*a*/110*b*. In some examples, the first data 110*a* and/or second data 110*b* include business registration data. For example, the business registration data can include a business address, a business name, a business status, a jurisdiction of incorporation of the business, a date of incorporation, and/or a business entity type. The business registration data may include additional and/or alternative types of business registration data that may be recognized by those of ordinary skill in the art.

In some examples, the first data 110a and/or second data 110b include other types of data, such as personal identifiable information, medical data, employment data, travel expense data, logistic data (e.g., for consumer goods, commercial products, shipments, etc.), utility company data, mortgage company data, insurance company data, real estate company data, phone company data, finance company data, bill payment data, and/or other types of data recognized by those of ordinary skill in the art.

Computing device 102 may include a communication system 112, a schema manager or component 114, a back-end schema mapper or component 116, and/or a front-end schema mapper or component 118. In some examples, computing device 102 can execute at least a portion of the schema manager 114 to instantiate a base schema, configure the base schema with template metadata (e.g., template functions), populate attributes of the base schema, store metadata associated with the base class, derive stage schemas from the base schema, pass metadata and/or attributes from the base schema to the stage schemas (e.g., implementing the OOP concept of inheritance from the base schema to the stage schemas), and/or dynamically updating attributes of the stage schemas. Further, in some examples, computing device 102 can execute at least a portion of the back-end schema mapper 116 to extract features from a stage schema associated with a respective data source to a master schema in which data from across different data sources is transformed into a uniform format. Further, in some examples, computing device 102 can execute at least a portion of the front-end schema mapper 118 to map data from the master schema to a user-interface, such as in response to a query from a user.

Server 104 may include a communication system 112, a schema manager or component 114, a back-end schema mapper or component 116, and/or a front-end schema mapper or component 118. In some examples, server 104 can execute at least a portion of the schema manager 114 to instantiate a base schema, configure the base schema with template metadata (e.g., template functions), populate attributes of the base schema, store metadata associated with the base class, derive stage schemas from the base schema, pass metadata and/or attributes from the base schema to the stage schemas (e.g., implementing the OOP concept of inheritance from the base schema to the stage schemas), and/or dynamically updating attributes of the stage schemas. Further, in some examples, server 104 can execute at least a portion of the back-end schema mapper 116 to extract features from a stage schema associated with a respective data source to a master schema in which data from across different data sources is transformed into a uniform format. Further, in some examples, server 104 can execute at least a portion of the front-end schema mapper 118 to map data from the master schema to a user-interface, such as in response to a query from a user.

Additionally, or alternatively, in some examples, computing device 102 can communicate data received from the plurality of data sources 106 to the server 104 over communication network 108, which can execute at least a portion of schema manager 114, back-end schema mapper 116, and/or front-end schema mapper 118. In some examples, schema manager 114, back-end schema mapper 116, and/or front-end schema mapper 118 may execute at least a portion of method/process 200 discussed later herein in connection with FIG. 2.

In some examples, computing device 102 and/or server 104 can be any suitable computing device or combination of devices, such as a desktop computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing devices 102 and/or a plurality of servers 104.

In some examples, the plurality of data sources 106 can be any suitable source of data (e.g., business data), such as a database, repository, and/or data store. In a more particular example, the plurality of data sources 106 can include memory storing data (e.g., local memory of computing device 102, local memory of server 104, cloud storage, portable memory connected to computing device 102, portable memory connected to server 104, etc.). In another more particular example, the plurality of data sources 106 can include an application configured to generate data. In some examples, the plurality of data sources 106 can be local to computing device 102. Additionally, or alternatively, the plurality of data sources 106 can be remote from computing device 102 and can communicate data 110 (e.g., first data 110a from the first data source 106a and second data 110b from the second data source 106b) to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

In some examples, aspects of the one or more computing devices 102 and/or one or more servers 104 define a staging area and data warehouse system. Further, in some examples, aspects of the one or more computing devices 102 and/or one or more servers 104 define a storage layer of the data warehouse system. For example, the staging area can be an intermediary storage location (e.g., within the computing devices 102 and/or servers 104) to hold data as it is being extract from the plurality of data sources 106, but before it is processed and stored in the storage layer (e.g., within the computing devices 102 and/or servers 104). The staging area of the computing devices 102 and/or servers 104 can include programs to perform data cleaning and pre-preprocessing techniques, such as filtering, standardizing, and/or validating data extracted from the plurality of data sources 106. The storage layer can be where processed data is stored and organized for querying. The storage layer can organize data into structured formats, such as tables, views, and/or schemas to ensure that data can be efficiently retrieved. Data stores in a storage layer are typically stored for a longer duration in time than data stored in the staging area.

In some examples, aspects of the one or more computing devices 102 and/or one or more servers 104 can function as a loader, state machine, and/or synchronization engine. For example, the loader can interact with the one or more data sources to receive raw data. The loader can use the state machine to initialize a data transformation process and/or prevent other processes from running at the same time. In some examples, the synchronization engine can interact with the state machine to initialize the data transformation process and/or prevent other processes from running at the same time. In some examples, the synchronization engine can facilitate receiving raw data, populating stage tables in stage schemas with the raw data, and/or moving the data from the populated stage tables to a master schema.

In some examples, a clock mechanism provides for triggering one or more levels of activity by the synchronization engine. For example, the clock can tick for checking for work to do, such that each time the clock ticks for checking for work to do the synchronization engine checks a state of the system to see what or if there is data to be processed (e.g., from one or more data sources and/or one or more stage schemas). As another example, the clock can tick for using a fully capacity of the system, such that each time the clock ticks for using the full capacity of the system the synchronization engine checks the state of the system to see if it has the computing resources to run an additional transformation in parallel with other transformations currently running (e.g., the state of the system can keep track of what is running, what has not been run, and/or what is finished running). Generally, use of the clock can enable the synchronization engine to transform data efficiently in terms of time and computing resources by checking one or more states of the system based on clock pulses.

Figure 2:
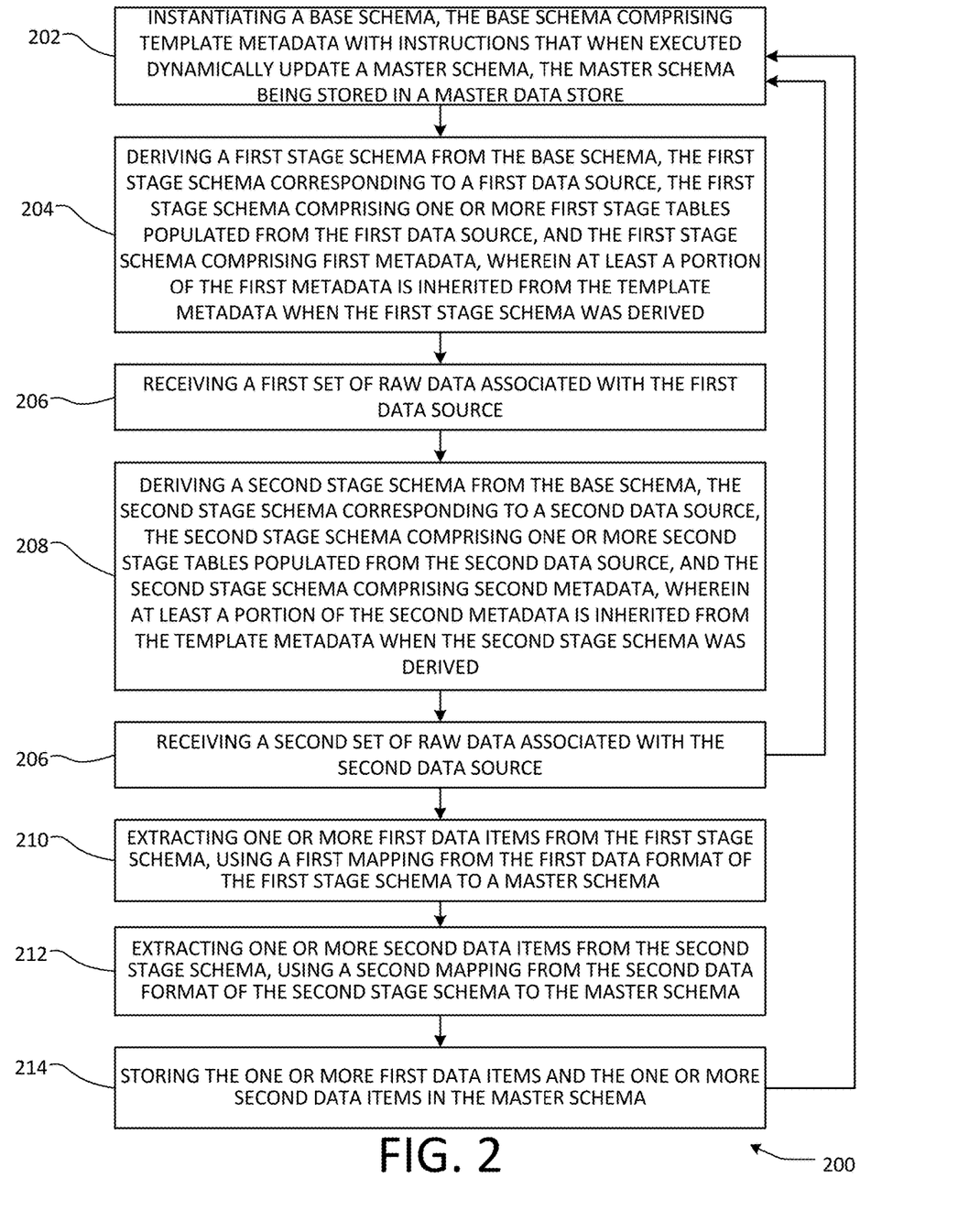
FIG. 2 illustrates an example method according to some aspects described herein.

FIG. 2 illustrates an example method 200. In examples, the method 200 is a method for transforming data, such as using database, OOP, and stored program concepts. In examples, aspects of method 200 are performed by a device, such as computing device 102 and/or server 104, discussed above with respect to FIG. 1. One or more aspects of method 200 may be performed on the same device and/or different devices than one or more other aspects of method 200.

Method 200 begins at operation 202, where a base schema is instantiated. The base schema includes template metadata that when executed dynamically update a master schema. The base schema can be analogous to a base class in OOP. The base schema can include a common set of tables, columns, and/or methods (e.g., stored procedures and/or functions). Other schemas can inherit the tables, columns, and/or methods from the base schema, mimicking the OOP concept of inheritance. Accordingly, schemas created based on the base schema can reuse the base schema's structure, while having additional and/or other features. In some examples, schemas derived from the base schema extend the functionality of base schemas by inheriting attributes and/or methods, such as by inheriting the template metadata.

Examples of programming languages that support OOP paradigms analogous to paradigms applied to databases with techniques herein include Java, C++, Python, C#, Ruby, Swift, Objective C. These programming language can vary in their support of OOP principles, but they all provide mechanisms to define and manipulate objects and classes.

In some examples, the base class is a database transformer for transforming data from a data source into a master format (e.g., master schema). In some examples, the database transformer can be managed via a model-view controller. For example, a model can represent the data and logic of the database transformer and be responsible for retrieving, storing, and processing data. In some examples, the model is supplied with data from the view and the first stage schema. The view can represent the user interface and presentation layer of the database transformer, to provide user interaction with the data transformer. In some examples, the view is a service that can connect to and monitor multiple models (and, therefore, multiple data transformers) simultaneously. A controller can act as an intermediary between the model and the view, such as to receive input from the view and process the input, possibly modifying the model as a result. In some examples, the controller interacts with the view to monitor the state of numerous data transformer instances and can interact with (e.g., control) configurations and/or actions of the data transformers.

At operation 204, a first stage schema is derived from the base schema. The first stage schema corresponds to a first data source. The first stage schema includes one or more first stage data structures (e.g., tables) populated from the first data source. In some examples, the table includes rows, columns, and/or depth. In some examples, the first stage schema includes additional and/or alternative data structures for storing data from the first data source.

In some examples, the first stage schema includes a state of the first set of raw data and/or of the master schema. For example, the state can include when one or more attributes of the first set of raw data and/or the master schema were last updated. Additionally, and/or alternatively, the state can include a version of the first set of raw data and/or of the master schema (e.g., a first version, second version, etc.).

In some examples, the first stage schema includes first metadata with first instructions that when executed dynamically update the master schema. For example, the metadata can include instructions (e.g., SQL statements or statements in another programming language) that when executed dynamically update the first stage schema and/or master schema based on the first set of raw data and its state. Accordingly, in some examples, when the state of the first set of raw data is updated, such as because data in/from the first data source is updated, the first stage schema can automatically update to include changes in data from the first data source.

In some examples, at least a portion of the first metadata is inherited from the template metadata when the first stage schema was derived from the base schema. For example, when a new stage schema is instantiated, created and/or derived, the stage schema may be automatically populated with metadata from the base class. For example, the new stage schema can inherit instructions (e.g., SQL statements or statements in another programming language), data structures, variables, or other forms of metadata from the base class. In some examples, parameters of the instructions can be dynamically substituted at run time to parameters specific to the new stage schema. Accordingly, it can be a benefit of techniques provided herein that metadata for stage schemas associated with data sources can be reusable to ease implementation and scalability with a relatively large number of data sources, without having to individual program each stage schema in its entirety.

At operation 206, a first set of raw data is received. The first set of raw data is associated with a first data source. In some examples, the first data source is a database, such as a database of and/or associated with a data provider. In some examples, the first set of raw data is in a first data format. In some examples, the first stage tables of the first stage schema are populated based on the first set of raw data. Further, in some examples, the first instructions are configured to dynamically update the master schema based on the first set of raw data and its state.

In some examples, the first set of raw data includes business registration data. Accordingly, once populated based on the first set of raw data, the first stage schema includes business registration data. For example, the business registration data can include a business address, a business name, a business status, a jurisdiction of incorporation of the business, a date of incorporation, and/or a business entity type. The business registration data may include additional and/or alternative types of business registration data that may be recognized by those of ordinary skill in the art.

In some examples, the first set of raw data and/or first stage schema includes other types of data, such as personal identifiable information, medical data, employment data, travel expense data, logistic data (e.g., for consumer goods, commercial products, shipments, etc.), utility company data, mortgage company data, insurance company data, real estate company data, phone company data, finance company data, bill payment data, and/or other types of data recognized by those of ordinary skill in the art.

In some examples, a first token or hash is generated, based on the first stage schema. In some examples the first token or hash can be generated using tokenization/hashing methods discussed, for example, in U.S. patent application Ser. No. 18/608,903, entitled "GENERATING A RELIABLE BIOMETRIC HASH," filed on Mar. 18, 2024, which is incorporated herein by reference in its entirety. In some examples, by converting the first stage schema to a token or hash, data from the first stage schema can be extracted relatively more quickly and populated into a master schema. Further, in some examples, data in the master schema can be stored in tokenized or hashed formats, such that data retrieved from the master schema can be performed relatively quickly.

At operation 208, a second stage schema is derived from the base schema. The second stage schema corresponds to a second data source different than the first data source. The second stage schema includes one or more second stage data structures (e.g., tables) populated from the second data source. In some examples, the second stage data structures are different than the first stage data structures (e.g., a different number of tables, different attributes within the tables, different numbers of columns, different numbers of rows, etc.). In some examples, the table includes rows, columns, and/or depth. In some examples, the second stage schema includes additional and/or alternative data structures for storing data from the second data source.

In some examples, the second stage schema includes a state of the second set of raw data and/or of the master schema. For example, the state can include when one or more attributes of the second set of raw data and/or the master schema were last updated. Additionally, and/or alternatively, the state can include a version of the second set of raw data and/or of the master schema (e.g., a first version, second version, etc.).

In some examples, the second stage schema includes second metadata with second instructions that when executed dynamically update the master schema. For example, the metadata can include instructions (e.g., SQL statements or statements in another programming language) that when executed dynamically update the second stage schema and/or master schema based on the first set of raw data and its state. Accordingly, in some examples, when the state of the second set of raw data is updated, such as because data in/from the second data source is updated, the second stage schema can automatically update to include changes in data from the second data source.

In some examples, at least a portion of the second metadata is inherited from the template metadata when the second stage schema was derived from the base schema. For example, when a new stage schema is instantiated, created and/or derived, the stage schema may be automatically populated with metadata from the base class. For example, the new stage schema can inherit instructions (e.g., SQL statements or statements in another programming language), data structures, variables, or other forms of metadata from the base class. In some examples, parameters of the instructions can be dynamically substituted at run time to parameters specific to the new stage schema. Accordingly, it can be a benefit of techniques provided herein that metadata for stage schemas associated with data sources can be reusable to ease implementation and scalability with a relatively large number of data sources, without having to individual program each stage schema in its entirety.

At operation 210, a second set of raw data is received. The second set of raw data is associated with a second data source. In some examples, the second data source is a database, such as a database of and/or associated with a data provider. In some examples, the second set of raw data is in a second data format. For example, the second set of raw data may be organized using a different data format than the first set of raw data.

For example, the second data format can have different name(s), label(s), language(s), amounts of data, type(s) of data attributes, spelling(s), and/or acronym(s) than the first data format. In some examples, the first data format can include a first language (e.g., English, French, Spanish, Mandarin, etc.) and the second data format can include a second language that is different than the first language. As another example, the first data format can include a different number of data items than the second data format, such as different numbers of tables and/or variables. In some examples, data from a United Kingdom data source can be in English an include eight different tables of addresses, whereas data from a France data source can be in French and include two different tables of addresses, and data from an Australian data source can be in English and include five different tables of addresses. Additional and/or alternative differences that may exist between the data formats should be recognized by those of ordinary skill in the art.

In some examples, the second stage tables of the second stage schema are populated based on the second set of raw data. Further, in some examples, second instructions are configured to dynamically update the master schema based on the second set of raw data and its state.

In some examples, the second set of raw data includes business registration data. Accordingly, once populated based on the second set of raw data, the second stage schema includes business registration data. For example, the business registration data can include a business address, a business name, a business status, a jurisdiction of incorporation of the business, a date of incorporation, and/or a business entity type. The business registration data may include additional and/or alternative types of business registration data that may be recognized by those of ordinary skill in the art.

In some examples, the second set of raw data and/or second stage schema includes other types of data, such as personal identifiable information, medical data, employment data, travel expense data, logistic data (e.g., for consumer goods, commercial products, shipments, etc.), utility company data, mortgage company data, insurance company data, real estate company data, phone company data, finance company data, bill payment data, and/or other types of data recognized by those of ordinary skill in the art.

In some examples, a second token or hash is generated, based on the second stage schema. In some examples the second token or hash can be generated using tokenization/hashing methods discussed, for example, in U.S. patent application Ser. No. 18/608,903, entitled "GENERATING A RELIABLE BIOMETRIC HASH," filed on Mar. 18, 2024, which is incorporated herein by reference in its entirety. In some examples, by converting the second stage schema to a token or hash, data from the second stage schema can be extracted relatively more quickly and populated into a master schema. Further, in some examples, data in the master schema can be stored in tokenized or hashed formats, such that data retrieved from the master schema can be performed relatively quickly.

It should be recognized by those of ordinary skill in the art that while FIGS. 1 and 2 illustrate only two data sources, the techniques provided herein may used with any plural number of data sources. In some examples, the benefits of efficiently transforming data from various different formats to a uniform master schema are even more appreciated when the techniques herein are applied to a relatively larger number of data sources with different data formats.

At operation 212, one or more first data items from the first stage schema are extracted. For example, the one or more first data items may be extracted from the first stage tables and/or first stage data structures of the first stage schema. The one or more first data items are extracted using a first mapping. In some examples, the first mapping is mapping from the first stage schema to the master schema. In some examples, the first mapping is mapping from the first set of raw data to the master schema. In some examples, the master schema is stored in a master data store. For example, the master schema can be stored in memory of the computing device(s) 102 and/or server(s) 104. In some examples, the master schema is stored in the storage layer of the data warehouse system discussed earlier herein (e.g., defined in part by the computing devices 102 and/or servers 104).

In some examples, the first mapping is a file stored in memory that indicates what locations in the first stage schema and/or first set of raw data correspond to what locations in the master schema. In some examples, the first mapping is generated manually. For example, someone can visually analyze the first stage schema and/or first set of raw data associated with the first data source, and program a mapping (e.g., the file stored in memory) of attributes in the first stage schema and/or first set of raw data to locations in the master schema.

In some examples, the first mapping is generated automatically. For example, a machine-learning model can be trained based on sample stage schemas and a sample master schema to determine a mapping from attributes in the sample stage schemas to corresponding locations of those attributes in the master schema. The machine-learning model can then receive input of a new (e.g., the first stage schema) stage schema and predict the mapping of attributes in the new stage schema to the master schema. As another example, a machine-learning model can be trained based on sample sets of raw data and a sample master schema to determine a mapping from attributes in the sample sets of raw data to corresponding locations of those attributes in the master schema. The machine-learning model can then receive input of a new set of raw data (e.g., the first set of raw data) and predict the mapping of attributes in the new set of raw data to the master schema.

In some examples, the machine-learning model can be a neural network. In some examples, the machine-learning model can be trained using supervised training, such as via labelled inputs and/or outputs. In some examples, the machine-learning model can be a large language model (LLM). For example, the machine-learning model can be an LLM that is trained to generate method statements to transform the set of raw data and/or stage schema to an appropriate format for the master schema. In some examples, the method statements can be stored as metadata in the stage schema associated with the raw data being transformed to the master schema.

At operation 212, one or more second data items from the second stage schema are extracted. For example, the one or more second data items may be extracted from the second stage tables and/or second stage data structures of the second stage schema. The one or more second data items are extracted using a first mapping. In some examples, the second mapping is mapping from the second stage schema to the master schema. In some examples, the second mapping is mapping from the second set of raw data to the master schema. In some examples, the master schema is stored in a master data store. For example, the master schema can be stored in memory of the computing device(s) 102 and/or server(s) 104. In some examples, the master schema is stored in the storage layer of the data warehouse system discussed earlier herein (e.g., defined in part by the computing devices 102 and/or servers 104).

In some examples, the second mapping is a file stored in memory that indicates what locations in the second stage schema and/or second set of raw data correspond to what locations in the master schema. In some examples, the second mapping is generated manually. For example, someone can visually analyze the second stage schema and/or second set of raw data associated with the second data source, and program a mapping (e.g., the file stored in memory) of attributes in the second stage schema and/or second set of raw data to locations in the master schema.

In some examples, the second mapping is generated automatically. For example, a machine-learning model can be trained based on sample stage schemas and a sample master schema to determine a mapping from attributes in the sample stage schemas to corresponding locations of those attributes in the master schema. The machine-learning model can then receive input of a new (e.g., the second stage schema) stage schema and predict the mapping of attributes in the new stage schema to the master schema. As another example, a machine-learning model can be trained based on sample sets of raw data and a sample master schema to determine a mapping from attributes in the sample sets of raw data to corresponding locations of those attributes in the master schema. The machine-learning model can then receive input of a new set of raw data (e.g., the second set of raw data) and predict the mapping of attributes in the new set of raw data to the master schema.

In some examples, the machine-learning model can be a neural network. In some examples, the machine-learning model can be trained using supervised training, such as via labelled inputs and/or outputs. In some examples, the machine-learning model can be a large language model (LLM). For example, the machine-learning model can be an LLM that is trained to generate method statements to transform the set of raw data and/or stage schema to an appropriate format for the master schema. In some examples, the method statements can be stored as metadata in the stage schema associated with the raw data being transformed to the master schema.

At operation 216, the one or more first data items (extracted from operation 210) and the one or more second data items (extracted from operation 212) are stored in the master schema. For example, the one or more first data items and the one or more second data items may be stored in the master data store in a format associated with the master schema. Generally, method 200 allows for aggregating data from a plurality of different data sources that have different data formats, and efficiently storing attributes from the aggregated data in a uniform format. The uniform format can ease retrieval operations for later presenting at least some of the aggregated data to one or more users (e.g., via a user interface). Additionally, method 200 allows for easily creating (e.g., deriving) stage schemas based on a base schema, to inherit metadata (e.g., transformation functions, data structures, attributes, etc.) from the base schema.

In some examples, the method 200 includes polling the data sources (e.g., the first data source and/or the second data source) to receive update sets of raw data (e.g., an updated first set of raw data and/or an updated second set of raw data). In some examples, the updated set of raw data from the data source is compared to the data stored in the data structures of the stage schema associated with the data source to determine whether the updated set of raw data is different than the initial set of raw data. For example, data in the data source may have been updated since the initial set of raw data was received from the data source. After determining that the updated set of raw data is different than the initial set of raw data, method 200 can include re-populating the stage data structures (e.g., tables) based on the update set of raw data. Further, method 200 can include updating one or more data items previously extracted from the stage data structures (e.g., at operations 212 and/or 214) with one or more updated data items extracted from the updated set of raw data to the master schema. In some examples, the updated data items can be extracted using the same mapping with which the initial data items were extracted from the stage schema and/or raw data to the master schema.

In some examples, the updated sets of raw data are received by polling the data sources at regular intervals of time (e.g., intervals of 1 minute, 5 minutes, 10 minutes, 15 minutes, 1 hour, etc.). Accordingly, in some examples, updates are received according to a clock mechanism. In some examples, the updated sets of raw data may be received at a first interval of time and data items extracted from the sets of raw data can be updated at a second interval of time (e.g., a different interval of time than the first interval of time). In some examples, the receiving of updated sets of raw data and updating of data items can happen sequentially. In some examples, the receiving of updated sets of raw data and updating of data items can happen in parallel (e.g., an updated first set of raw data can be received, and then one or more first data items extracted initially can be updated in parallel with an updated second set of raw data being received).

In some examples, the updated sets of raw data are received by polling the data sources at irregular intervals of time. For example, the updated sets of raw data can be received in response to certain events, such as a signal from one or more of the data sources that they have been updated. In some examples, data items extracted can be updated at irregular intervals of time. For example, the data items can be updated in response to certain events, such as a comparison determining that one or more data items extracted from an initial set of raw data are different than one or more data items in the updated set of raw data.

In some examples, the clock mechanism provides for triggering one or more levels of activity by a synchronization engine. For example, the clock can tick for checking for work to do, such that each time the clock ticks for checking for work to do the synchronization engine checks a state of the system to see what or if there is data to be processed (e.g., from one or more data sources and/or one or more stage schemas). As another example, the clock can tick for using a fully capacity of the system, such that each time the clock ticks for using the full capacity of the system the synchronization engine checks the state of the system to see if it has the computing resources to run an additional transformation in parallel with other transformations currently running (e.g., the state of the system can keep track of what is running, what has not been run, and/or what is finished running). Generally, use of the clock can enable the synchronization engine to transform data efficiently in terms of time and computing resources by checking one or more states of the system based on clock pulses.

Figure 5:
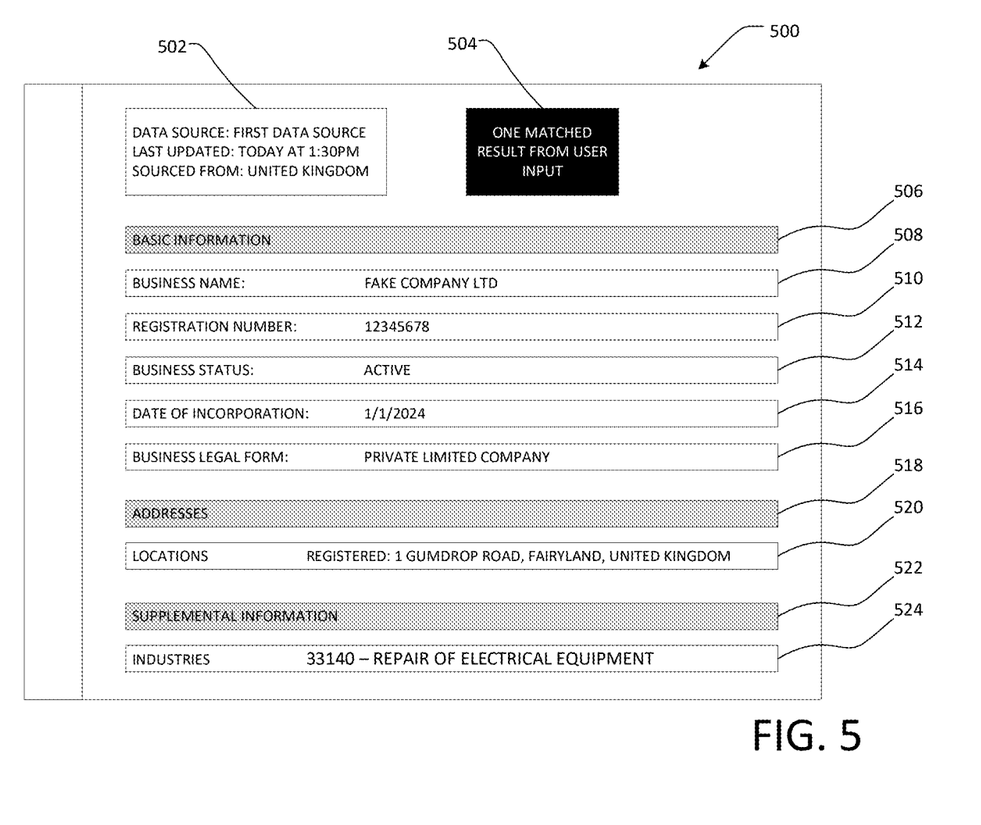
FIG. 5 illustrates an examples user interface, according to some aspects described herein.

In some examples, method 200 further includes causing a user interface to be generated, such as user interface 500 of FIG. 5. In some examples, the user interface is a graphical user interface. In some examples, the user interface is configured to receive input from a user. For example, method 200 can include receiving a query, such as via the user interface. In some examples, the query can be a request from a user to access data stored in the master schema. In some examples, the query can be included in an application programming interface (API) call to access the data stored in the master schema. For example, if the stage schemas and/or sets of raw data include business registration data, then the query can include a request (e.g., via an API call) for business registration data of a particular business.

In some examples, the user interface can be populated, based on the query, to include at least one data item from the one or more first data items and the one or more second data items stored in the master schema (e.g., at operation 214). In some examples, the at least one data item can be extracted from the master schema using a front-end mapping from the master schema to the user interface. Therefore, in some examples, a user can search for information aggregated from the plurality of data sources, relatively easily, based on the efficient storage of the aggregated information in the master schema.

In some examples, the front-end mapping is a file stored in memory that indicates what locations in the master schema correspond to what locations in the user interface. In some examples, the front-end mapping is generated manually. For example, someone can program a mapping (e.g., the file stored in memory) of attributes in the master schema to corresponding locations in the user interface (e.g., locations on a graphical display).

In some examples, the front-end mapping is generated automatically. For example, a machine-learning model can be trained based on a sample master schema and a sample user interface to determine a mapping from attributes in the master schema to corresponding locations of those attributes in the user interface. The machine-learning model can then receive input of a new master schema and predict the mapping of attributes in the new master schema to the user interface.

In some examples, the machine-learning model can be a neural network. In some examples, the machine-learning model can be trained using supervised training, such as via labelled inputs and/or outputs. In some examples, the machine-learning model can be a large language model (LLM). For example, the machine-learning model can be an LLM that is trained to generate method statements to transform attributes in the master schema to an appropriate format for the user interface. In some examples, the method statements can be stored as metadata, such as may be executed based on a query associated with the user interface on which an indication of one or more attributes from the master schema are to be displayed.

Method 200 may terminate at operation 214. Alternatively, method 200 may return to operation 202 (or any other operation from method 200) to provide an iterative loop, such as of receiving a plurality of different stage schemas with different respective data formats and transforming data from the plurality of different stage schemas into a master schema, using object-oriented programming paradigms and stored metadata functionality.

Figure 3:
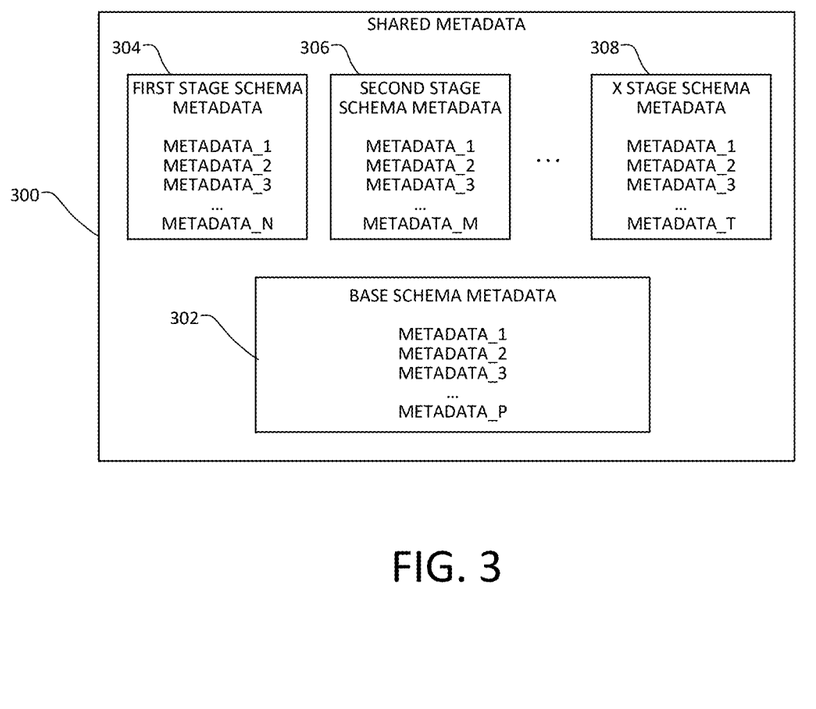
FIG. 3 illustrates an example diagram of metadata inherited from a base schema to stage schemas.

FIG. 3 illustrates an example diagram 300 of metadata inherited from a base schema 302 to stage schemas, such as a first stage schema 304, a second stage schema 306, and a third stage schema 308. In some examples, the metadata includes stored procedures, functions, and/or instructions. The metadata can include reusable blocks of logic that operates on data stored within the schemas 302-308, such as raw data that has been populated into the stage schemas 304-308 after being received from data sources. The metadata can provide behavior, calculation, and/or processing steps to transform data efficiently.

In examples, the stage schemas 304-308 are derived from the base schema 302, such that the base schema 302 is similar to an abstract class in an OOP, from which characteristics can be inherited. Accordingly, the stage schemas 304-308 can inherit metadata from the base schema 302, such that at least a portion of the metadata of the stage schemas 302-304 is inherited from the base schema metadata. The base schema metadata can be a template of processes to reduce the time and energy needed to create the stage schemas. For example, when creating millions of stage schemas, by allowing metadata (e.g., method instructions) to be inherited from the base schema, the amount of time needed to program the stage schemas can be significantly reduced.

Figure 4:
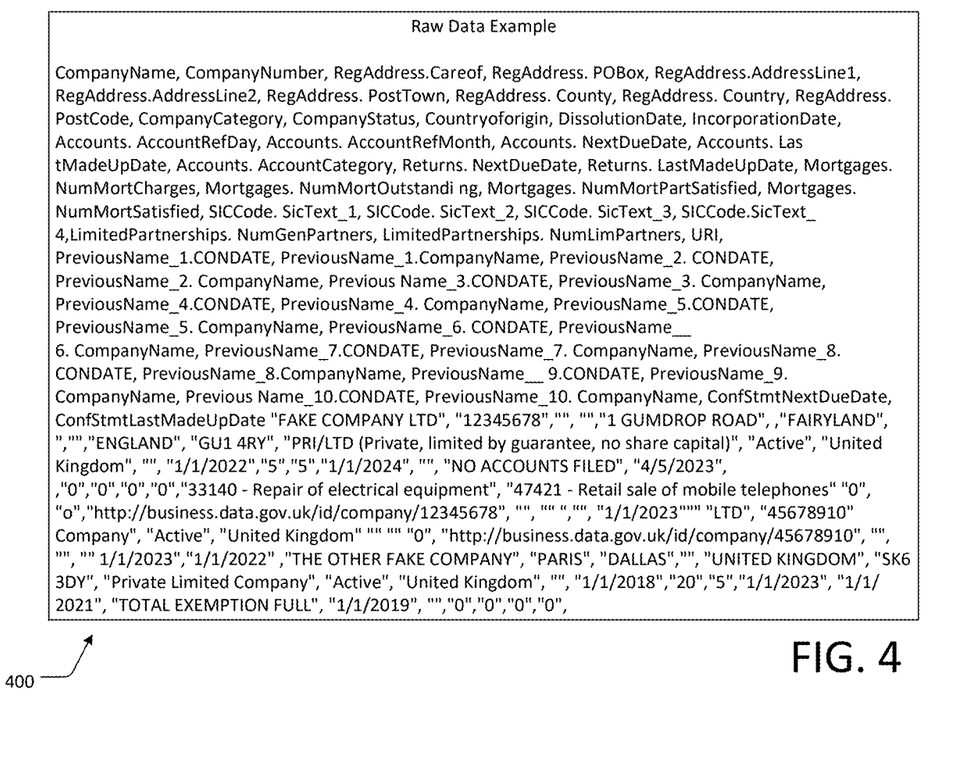
FIG. 4 illustrates an example of a raw data input, according to some aspects described herein.

FIG. 4 illustrates an example of a raw data input 400 according to some aspects of the present disclosure. In some examples, raw data is data that comes from external sources in an unorganized and unstructured form. In some examples, raw data is not even in first normal form, meaning it can be flattened with many repeating fields and lack explicit relationships between data points. In some examples, raw data requires transformation into a structured format, such as through custom logic applied within a schema.

In some examples, the raw data input 400 is received from a data source, such as the first data source 106a and/or the second data source 106b of FIG. 1. In some examples, the raw data input 400 is unprocessed data that is initially collected and/or received by a data warehouse (e.g., defined by the computing device(s) 102 and/or server(s) 104). In some examples, the raw data input 400 is populated into a stage schema that include data in a particular data format, such as in one or more particular tables. In some examples, raw data inputs from different data sources have different data formats, making it difficult to extract information efficiently for displaying in a user-friendly manner.

The raw data input 400 may be received, such as described in method 200, such that method 200 can transform attributes of the raw data input 400 into a uniform format (e.g., a master schema or canonical data model).

FIG. 5 illustrates an example user interface (UI) 500 according to some aspects of the present disclosure. The example user-interface 500 is a graphical user-interface (GUI). In some examples, the GUI 500 is displayed on a screen, such as a screen of computing device 102 of FIG. 1.

The UI 500 includes a plurality of indications, such as a first visual indication 502, a second visual indication 504, a third visual indication 506, a fourth visual indication 508, a fifth visual indication 510, a sixth visual indication 512, a seventh visual indication 514, an eighth visual indication 516, a ninth visual indication 518, a tenth visual indication 520, an eleventh visual indication 522, and a twelfth visual indication 524.

One of ordinary skill in the art should recognize that the plurality of visual indications 502-524 are merely examples. Additional, fewer, and/or alternative indications can be used according to some embodiments of the present disclosure. Further, some examples provided herein can include audio indications, such as in addition to and/or instead of visual indications.

In some examples, the first visual indication 502 includes from what data source information being displayed has been received (e.g., a first data source, a second data source, and/or another data source). The first visual indication 502 can further include when the data being presented was last updated. For example, if a data source was polled today and resulted in an update to one or more data attributes being displayed, then the first visual indication can that the data source was last updated today. In some examples, the last updated information can include a date and/or time. Further, in some examples, the first visual indication 502 can include an origin of the data being presented, such as a country, town, company, institution, and/or the like, with which the data source is associated.

In some examples, the second visual indication 504 includes a notification of how many results were queried based on user input. For example, a user may provide a query to the UI 500 to generate the results shown. In some examples, the user's query can provide a single result (e.g., attributes associated with a single business). In some examples, the user's query can provide a plurality of results (e.g., attributes associated with a plurality of businesses. For instance, if the user requests information about a particular business, using the business' name, then a single result may be presented. However, if the user requests information about all businesses in a given industry, then information for a plurality of businesses operating in that industry may be presented.

In some examples, the third visual indication 506 includes a description to notify a user of a grouping of visual indications listed below it. For example, the visual indications 508-516 listed below the third visual indication 506 are all grouped as being basic information for a business.

In some examples, the fourth visual indication 508 includes an attribute of data received from a data source and stored in the master schema, which corresponds to the user's query. For example, the fourth visual indication 508 includes a business name of a particular business.

In some examples, the fifth visual indication 510 includes an attribute of data received from a data source and stored in the master schema, which corresponds to the user's query. For example, the fifth visual indication 510 includes a registration number of the particular business.

In some examples, the sixth visual indication 512 includes an attribute of data received from a data source and stored in the master schema, which corresponds to the user's query. For example, the fifth visual indication 512 includes a business status (e.g., active, dormant, expired) of the particular business.

In some examples, the seventh visual indication 514 includes an attribute of data received from a data source and stored in the master schema, which corresponds to the user's query. For example, the seventh visual indication 514 includes a date of incorporation of the particular business.

In some examples, the eighth visual indication 516 includes an attribute of data received from a data source and stored in the master schema, which corresponds to the user's query. For example, the eighth visual indication 516 includes a business entity type of the particular business. In some examples, the business entity type includes a sole proprietorship, a limited liability corporation, a private limited company, a c corporation, an s corporation, and/or another business entity type which may be recognized by those of ordinary skill of the art.

In some examples, the ninth visual indication 518 includes a description to notify a user of a grouping of visual indications listed below it. For example, the tenth visual indication 520 listed below the ninth visual indication 518 is grouped as being an address for the particular business. In some examples, the tenth visual indication 520 includes a registration address of the particular business. In some examples, additional and/or alternative visual indications can be listed below the ninth visual indication 518, such as an indication of a mailing address, a headquarters address, a sales location address, a store address, and/or other types of addresses.

In some examples, the eleventh visual indication 522 includes a description to notify a user of a grouping of visual indications listed below it. For example, the twelfth visual indication 524 listed below the eleventh visual indication 524 is grouped as being supplemental information for the particular business. In some examples, the eleventh visual indication 522 includes an industry of the particular business. In some examples, additional and/or alternative visual indications can be listed below the eleventh visual indication 522, such as an indication of a shareholder of the particular business, an officer of the particular business, and/or other types of supplemental information.

Generally, the GUI 500 of FIG. 5 provides user-friendly and effective techniques for presenting data to a user, after the data has been aggregated from a plurality of different data sources with different data formats that would otherwise be unfriendly for a user to navigate and view.

Figure 6:
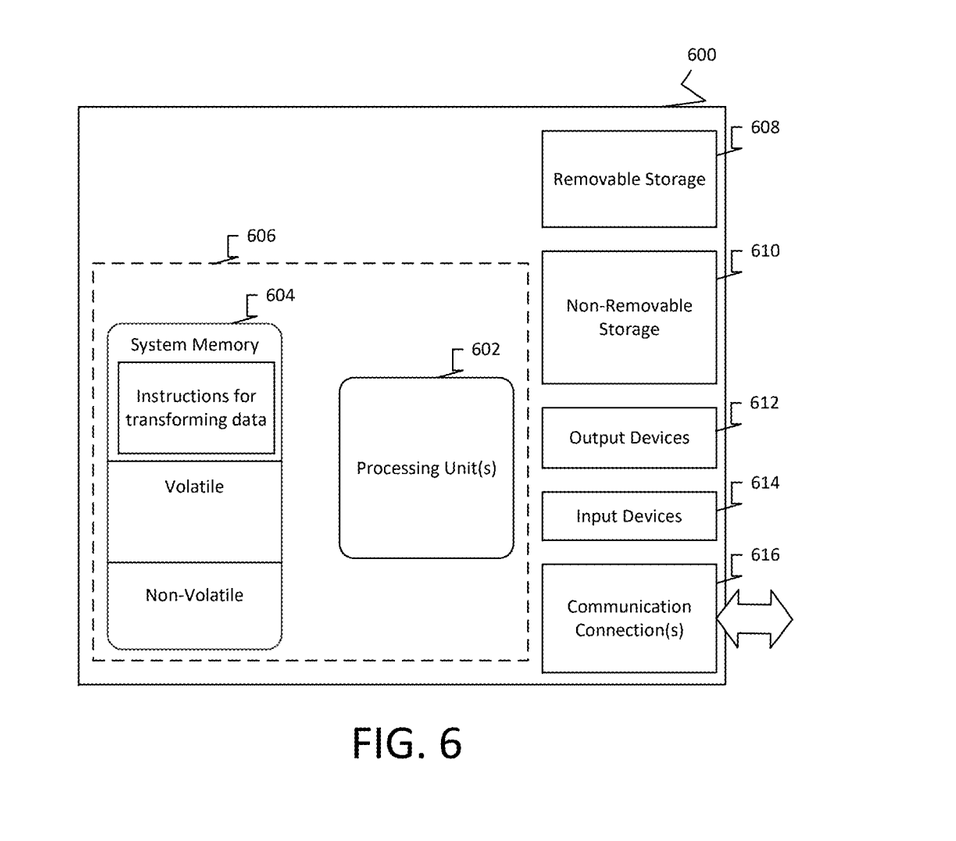
FIG. 6 illustrates a simplified block diagram of a device with which aspects of the present disclosure may be practiced in accordance with aspects of the present disclosure.

FIG. 6 and the associated descriptions provide a discussion of a variety of operating environments in which aspects of the disclosure may be practiced. However, the devices and systems illustrated and discussed with respect to FIG. 6 are for purposes of example and illustration and are not limiting of a vast number of computing device configurations that may be utilized for practicing aspects of the disclosure, described herein.

FIG. 6 illustrates a simplified block diagram of a device with which aspects of the present disclosure may be practiced in accordance with aspects of the present disclosure. The device may be a mobile computing device, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (e.g., instructions for transforming data as disclosed herein, etc.) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as remote controller, keyboard, mouse, pen, voice input, on-board sensors, etc. and/or output device(s) 612 such as a display, speakers, printer, motors, etc. Also included in the environment may be one or more communication connections 616, such as LAN, WAN, a near-field communications network, a cellular broadband network, point to point, etc.

Operating environment 600 typically includes at least some form of computer readable media. Computer readable media can be any available media that can be accessed by the at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for transforming data. Any of the one or more examples provided herein may be used in combination with any other of the one or more examples provided herein.

In some examples, a method is provided. The method includes instantiating a base schema. The base schema includes template metadata with instructions that when executed dynamically update a master schema. The master schema is stored in a master data store. The method further includes deriving a first stage schema from the base schema. The first stage schema corresponds to a first data source. The first stage schema includes one or more first stage tables populated from the first data source, and the first stage schema includes first metadata with first instructions that when executed dynamically update the master schema. At least a portion of the first metadata is inherited from the template metadata when the first stage schema was derived from the base schema. The method further includes receiving a first set of raw data associated with the first data source. The first set of raw data is in a first data format, and the first stage tables of the first stage schema is populated based on the first set of raw data. The first instructions are configured to dynamically update the master schema based on the first set of raw data and its state. The method further includes deriving a second stage schema from the base schema. The second stage schema corresponds to a second data source. The second stage schema includes one or more second stage tables populated from the second data source, and the second stage schema includes second metadata with second instructions that when executed dynamically update the master schema. At least a portion of the second metadata is inherited from the template metadata when the second stage schema was derived from the base schema. The method further includes receiving a second set of raw data associated with the second data source, the second set of raw data being in a second data format, the second data format being different than the first data format, and the second stage tables of the second stage schema being populated based on the second set of raw data. The second instructions are configured to dynamically update the master schema based on the second set of raw data and its state. The method further includes extracting one or more first data items from the first stage tables, using a first mapping from the first stage schema to the master schema, extracting one or more second data items from the second stage tables, using a second mapping from the second stage schema to the master schema, and storing the one or more first data items and the one or more second data items in the master schema.

In some examples, the method includes receiving a query, and populating a user interface, based on the query, to include at least one data item from the one or more first data items and the one or more second data items stored in the master schema. In some examples, the first stage schema includes business registration data. In some examples, the query is regarding a particular business, and the user interface is populated with one or more data items of the business registration data that are associated with the particular business. In some examples, the business registration data includes at least one selected from a group including: a business address, a business name, a business status, a jurisdiction of incorporation, a date of incorporation, and a business entity type.

In some examples, the method includes generating a first token, based on the first stage schema, generating a second token, based on the second stage schema, and extracting the one or more first data items from the first token and the one or more second data items from the second token. In some examples, the method includes polling the first data source to receive an updated first set of raw data, re-populating the first stage tables based on the updated first set of raw data, and updating the one or more first data items extracted from the first stage tables with one or more updated first data items extracted, using the first mapping, from the first stage schema to the master schema. In some examples, the first data source is polled at a regular interval of time.

In some examples, the first data format includes a first language and the second data format includes a second language. The second language is different than the first language. In some examples, the first data format includes a different number of data items than the second data format.

In some examples, a method is provided. The method includes instantiating a base schema. The base schema includes template metadata with instructions that when executed dynamically update a master schema. The master schema is stored in a master data store. The method further includes deriving a plurality of stage schemas from the base schema. Each stage schema of the plurality of stage schemas is associated with a respective data source of a plurality of data sources. Each stage schema includes a respective stage table populated from the respective data source, and each stage schema includes metadata with instructions that when executed dynamically update the master schema. At least a portion of the metadata for each stage schema is inherited from the template metadata when the respective stage schema was derived from the base schema. The method further includes receiving a plurality of sets of raw data. Each set of raw data of the plurality of sets of raw data is associated with a respective data source of the plurality of data sources. Each set of raw data of the plurality of sets of raw data is in a different data format than at least one other set of raw data of the plurality of sets of raw data, and each stage table of the plurality of stage schemas is populated based on a respective set of raw data. For each stage schema the respective instructions are configured to dynamically update the master schema based on the respective set of raw data for the stage schema and the state of the raw data. The method further includes extracting one or more respective data items from each stage table of the plurality of stage tables. The extracting for each stage tables of the plurality of stage tables is performed using a respective mapping from the corresponding stage schema to the master schema. The method further includes storing the one or more data items in the master schema, receiving a query, via a user interface, and populating the user interface, based on the query, to include at least one data item from the one or more data items stored in the master schema.

In some examples, the plurality of stage schemas include business registration data. In some examples, the query is regarding a particular business, and the at least one data item includes at least one item of business registration data associated with the particular business. In some examples, the business registration data includes at least one selected from a group including: a business address, a business name, a business status, a jurisdiction of incorporation, a date of incorporation, and a business entity type.

In some examples, the method further includes generating a plurality of tokens. In some examples, each token of the plurality of tokens corresponds to a respective stage schema of the plurality of stage schemas. In some examples, the extracting one or more respective data items from each stage table of the plurality of stage tables includes extracting the one or more data items from the plurality of tokens, such that one or more first data items are extracted from a first token of the plurality of tokens corresponding to a first stage schema of the plurality of stage schemas and one or more second data items are extracted from a second token of the plurality of tokens corresponding to a second stage schema of the plurality of stage schemas.

In some examples, a system is provided. The system includes a processor and memory storing instructions that, when executed by the processor, cause the system to perform a set of operations. The set of operations include instantiating a base schema. The base schema includes template metadata with instructions that when executed dynamically update a master schema. The master schema is stored in a master data store. The set of operations further includes deriving a first stage schema from the base schema. The first stage schema corresponds to a first data source. The first stage schema includes one or more first stage tables populated from the first data source, and the first stage schema includes first metadata with first instructions that when executed dynamically update the master schema. At least a portion of the first metadata is inherited from the template metadata when the first stage schema was derived from the base schema. The set of operations further includes receiving a first set of raw data associated with the first data source. The first set of raw data is in a first data format, and the first stage tables of the first stage schema is populated based on the first set of raw data. The first instructions are configured to dynamically update the master schema based on the first set of raw data and its state. The set of operations further includes deriving a second stage schema from the base schema. The second stage schema corresponds to a second data source. The second stage schema includes one or more second stage tables populated from the second data source, and the second stage schema includes second metadata with second instructions that when executed dynamically update the master schema. At least a portion of the second metadata is inherited from the template metadata when the second stage schema was derived from the base schema. The set of operations further includes receiving a second set of raw data associated with the second data source, the second set of raw data being in a second data format, the second data format being different than the first data format, and the second stage tables of the second stage schema being populated based on the second set of raw data. The second instructions are configured to dynamically update the master schema based on the second set of raw data and its state. The set of operations further includes extracting one or more first data items from the first stage tables, using a first mapping from the first stage schema to the master schema, extracting one or more second data items from the second stage tables, using a second mapping from the second stage schema to the master schema, and storing the one or more first data items and the one or more second data items in the master schema.

In some examples, the set of operations includes receiving a query, and populating a user interface, based on the query, to include at least one data item from the one or more first data items and the one or more second data items stored in the master schema. In some examples, the first stage schema includes business registration data. In some examples, the query is regarding a particular business, and the user interface is populated with one or more data items of the business registration data that are associated with the particular business. In some examples, the business registration data includes at least one selected from a group including: a business address, a business name, a business status, a jurisdiction of incorporation, a date of incorporation, and a business entity type.

In some examples, the set of operations includes generating a first token, based on the first stage schema, generating a second token, based on the second stage schema, and extracting the one or more first data items from the first token and the one or more second data items from the second token. In some examples, the set of operations includes polling the first data source to receive an updated first set of raw data, re-populating the first stage tables based on the updated first set of raw data, and updating the one or more first data items extracted from the first stage tables with one or more updated first data items extracted, using the first mapping, from the first stage schema to the master schema. In some examples, the first data source is polled at a regular interval of time.

In some examples, the first data format includes a first language and the second data format includes a second language. The second language is different than the first language. In some examples, the first data format includes a different number of data items than the second data format.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
    instantiating a base schema, the base schema comprising template metadata with instructions that when executed dynamically update a master schema, the master schema being stored in a master data store;
    deriving a first stage schema from the base schema, the first stage schema corresponding to a first data source, the first stage schema comprising one or more first stage tables populated from the first data source, and the first stage schema comprising first metadata with first instructions that when executed dynamically update the master schema, wherein at least a portion of the first metadata is inherited from the template metadata when the first stage schema was derived from the base schema;
    receiving a first set of raw data associated with the first data source, the first set of raw data being in a first data format, and the first stage tables of the first stage schema being populated based on the first set of raw data, wherein the first instructions are configured to dynamically update the master schema based on the first set of raw data and its state;
    deriving a second stage schema from the base schema, the second stage schema corresponding to a second data source, the second stage schema comprising one or more second stage tables populated from the second data source, and the second stage schema comprising second metadata with second instructions that when executed dynamically update the master schema, wherein at least a portion of the second metadata is inherited from the template metadata when the second stage schema was derived from the base schema;

receiving a second set of raw data associated with the second data source, the second set of raw data being in a second data format, the second data format being different than the first data format, and the second stage tables of the second stage schema being populated based on the second set of raw data, wherein the second instructions are configured to dynamically update the master schema based on the second set of raw data and its state;

extracting one or more first data items from the first stage tables, using a first mapping from the first stage schema to the master schema;

extracting one or more second data items from the second stage tables, using a second mapping from the second stage schema to the master schema; and storing the one or more first data items and the one or more second data items in the master schema.

2. The method of claim 1, further comprising:
receiving a query; and
populating a user interface, based on the query, to include at least one data item from the one or more first data items and the one or more second data items stored in the master schema.

3. The method of claim 2, wherein the first stage schema comprises business registration data, wherein the query is regarding a particular business, and wherein the user interface is populated with one or more data items of the business registration data that are associated with the particular business.

4. The method of claim 3, wherein the business registration data comprises at least one selected from a group comprising: a business address, a business name, a business status, a jurisdiction of incorporation, a date of incorporation, and a business entity type.

5. The method of claim 1, further comprising:
generating a first token, based on the first stage schema;
generating a second token, based on the second stage schema; and
extracting the one or more first data items from the first token and the one or more second data items from the second token.

6. The method of claim 1, further comprising:
polling the first data source to receive an updated first set of raw data;
re-populating the first stage tables based on the updated first set of raw data; and
updating the one or more first data items extracted from the first stage tables with one or more updated first data items extracted, using the first mapping, from the first stage schema to the master schema.

7. The method of claim 6, wherein the first data source is polled at a regular interval of time.

8. The method of claim 1, wherein the first data format comprises a first language and the second data format comprises a second language, the second language being different than the first language.

9. The method of claim 1, wherein the first data format comprises a different number of data items than the second data format.

10. A method comprising:
instantiating a base schema, the base schema comprising template metadata with instructions that when executed dynamically update a master schema, the master schema being stored in a master data store;

deriving a plurality of stage schemas from the base schema, each stage schema of the plurality of stage schemas being associated with a respective data source of a plurality of data sources, each stage schema comprising a respective stage table populated from the respective data source, and each stage schema comprising metadata with instructions that when executed dynamically update the master schema, wherein at least a portion of the metadata for each stage schema is inherited from the template metadata when the respective stage schema was derived from the base schema;

receiving a plurality of sets of raw data, each set of raw data of the plurality of sets of raw data being associated with a respective data source of the plurality of data sources, each set of raw data of the plurality of sets of raw data being in a different data format than at least one other set of raw data of the plurality of sets of raw data, and each stage table of the plurality of stage schemas being populated based on a respective set of raw data, wherein for each stage schema the respective instructions are configured to dynamically update the master schema based on the respective set of raw data for the stage schema and the state of the raw data;

extracting one or more respective data items from each stage table of the plurality of stage tables, the extracting for each stage tables of the plurality of stage tables being performed using a respective mapping from the corresponding stage schema to the master schema;

storing the one or more data items in the master schema;

receiving a query, via a user interface; and populating the user interface, based on the query, to include at least one data item from the one or more data items stored in the master schema.

11. The method of claim 10, wherein the plurality of stage schemas comprise business registration data, wherein the query is regarding a particular business, and wherein the at least one data item comprises at least one item of business registration data associated with the particular business.

12. The method of claim 11, wherein the business registration data comprises at least one selected from a group comprising: a business address, a business name, a business status, a jurisdiction of incorporation, a date of incorporation, and a business entity type.

13. The method of claim 10, further comprising:
generating a plurality of tokens, each token of the plurality of tokens corresponding to a respective stage schema of the plurality of stage schemas,
wherein the extracting one or more respective data items from each stage table of the plurality of stage tables includes extracting the one or more data items from the plurality of tokens, such that one or more first data items are extracted from a first token of the plurality of tokens corresponding to a first stage schema of the plurality of stage schemas and one or more second data items are extracted from a second token of the plurality of tokens corresponding to a second stage schema of the plurality of stage schemas.

14. A system comprising:
a processor; and
memory storing instructions that, when executed by the processor, cause the system to perform a set of operations, the set of operations comprising:

instantiating a base schema, the base schema comprising template metadata with instructions that when executed dynamically update a master schema, the master schema being stored in a master data store;

deriving a first stage schema from the base schema, the first stage schema corresponding to a first data source, the first stage schema comprising one or more first stage tables populated from the first data source, and the first stage schema comprising first metadata with first instructions that when executed dynamically update the master schema, wherein at least a portion of the first metadata is inherited from the template metadata when the first stage schema was derived from the base schema;

receiving a first set of raw data associated with the first data source, the first set of raw data being in a first data format, and the first stage tables of the first stage schema being populated based on the first set of raw data, wherein the first instructions are configured to dynamically update the master schema based on the first set of raw data and its state;

deriving a second stage schema from the base schema, the second stage schema corresponding to a second data source, the second stage schema comprising one or more second stage tables populated from the second data source, and the second stage schema comprising second metadata with second instructions that when executed dynamically update the master schema, wherein at least a portion of the second metadata is inherited from the template metadata when the second stage schema was derived from the base schema;

receiving a second set of raw data associated with the second data source, the second set of raw data being in a second data format, the second data format being different than the first data format, and the second stage tables of the second stage schema being populated based on the second set of raw data, wherein the second instructions are configured to dynamically update the master schema based on the second set of raw data and its state;

extracting one or more first data items from the first stage tables, using a first mapping from the first stage schema to the master schema;

extracting one or more second data items from the second stage tables, using a second mapping from the second stage schema to the master schema; and storing the one or more first data items and the one or more second data items in the master schema.

15. The system of claim 14, wherein the set of operations further comprises:
receiving a query; and
populating a user interface, based on the query, to include at least one data item from the one or more first data items and the one or more second data items stored in the master schema.

16. The system of claim 15, wherein the first stage schema comprises business registration data, wherein the query is regarding a particular business, and wherein the user interface is populated with one or more data items of the business registration data that are associated with the particular business.

17. The system of claim 16, wherein the business registration data comprises at least one selected from a group comprising: a business address, a business name, a business status, a jurisdiction of incorporation, a date of incorporation, and a business entity type.

18. The system of claim 14, wherein the set of operations further comprises:
generating a first token, based on the first stage schema;
generating a second token, based on the second stage schema; and
extracting the one or more first data items from the first token and the one or more second data items from the second token.

19. The system of claim 14, wherein the set of operations further comprises:
polling the first data source to receive an updated first set of raw data;
re-populating the first stage tables based on the updated first set of raw data; and
updating the one or more first data items extracted from the first stage tables with one or more updated first data items extracted, using the first mapping, from the first stage schema to the master schema.

20. The system of claim 14, wherein the first data format comprises a different number of data items than the second data format.

* * * * *